Patented Feb. 5, 1952

2,584,681

UNITED STATES PATENT OFFICE 2,584,681

POTENTIALLY REACTIVE FURAN IMPREGNATING SOLUTIONS

Andrew P. Dunlop, Riverside, and Paul R. Stout, Chicago, Ill., assignors to The Quaker Oats Company, a corporation of New Jersey No Drawing. Application November 1, 1946, Serial No. 707,336

4 Claims. (Cl. 260—70)

This invention relates to low viscosity, potentially reactive resin-forming impregnating solutions or compositions comprising furfuryl alcohol, ammonium thiocyanate and an aldehyde, which are capable of remaining reasonably constant in viscosity for practical periods of time in the order of from about three weeks to about two months and even longer. These low viscosity, potentially reactive solutions have high penetrating power and are especially adapted for use as impregnating solutions for porous materials such as plaster of Paris, sandstone, concrete, wood, fibrous materials of asbestos, glass and the like in corded, felted, woven or other form, etc. They are capable of being cured rapidly to the solid and infusible resinous state by heat, either with or without the aid of a catalyst, and they convert the impregnated materials into hard and tough products which are capable of resisting abrasion and impact, as well as the corrosive action of acidic and basic chemical reagents.

We have found that a mixture of furfuryl alcohol, ammonium thiocyanate and an aldehyde converts readily under the influence of heat to a water-insoluble, relatively viscous, liquid thermosetting resin. The viscosity of this resin is so high as to make it unsuitable for use as an impregnant. In fact, the mixture of these reactants and the application of heat thereto cause a very rapid rise in the viscosity of the original solution even before it is completely converted to the aforesaid resinous state, and this product has a relatively high viscosity and is also unsuitable for use as an impregnant because of its inability to penetrate porous materials readily.

Generally, the mere mixing of the aforesaid reactants results in a spontaneous exothermic reaction and a concomitant rapid rise in the viscosity of the solution. The amount of heat generated by this reaction varies with the proportions of the reactants and depends largely upon the particular aldehyde used. Thus, for example, when approximately molar proportions of formaldehyde or compounds which engender formaldehyde, such as paraformaldehyde and trioxymethylene, for example, and the other reactants are mixed, a spontaneous reaction sets in which raises the temperature of the mass to about the boiling point. With lesser proportions of formaldehyde the spontaneous reaction is not so marked. When aldehydes other than formaldehyde are used, such as furfural, acetaldehyde, propionaldehyde, butyraldehyde, glyoxal, benzaldehyde, crotonaldehyde, furylacrolein, etc., the amount of heat generated is usually not sufficient to bring the mass to the boiling point, but, generally, except for furfural, the heat generated is sufficient to raise the viscosity of the solution to such an extent as to make it unsuitable for use as an impregnant.

In accordance with the present invention the mixing of the furfuryl alcohol, ammonium thiocyanate and the aldehyde are controlled to prevent the generation of substantial heat and thereby produce the aforesaid stable, low viscosity, potentially reactive, impregnating solutions. In the case of furfural such control may not be necessary for generally this aldehyde may be mixed simultaneously with furfuryl alcohol and ammonium thiocyanate without initially generating sufficient heat to raise substantially the viscosity of the solution. However, solutions of furfural, ammonium thiocyanate and furfuryl alcohol produced by simultaneously mixing the reactants, generally have substantially stable viscosities for only approximately three to four weeks. Thereafter, the viscosities of these solutions tend to rise rapidly and they become unsuitable for use as impregnants.

The control of the mixing of the reactants to produce the stable, low viscosity, impregnating solutions of the present invention may be as follows:

1. The aldehyde and the ammonium thiocyanate are mixed and held for about 1 to 24 hours, generally for about 16 to 18 hours, at approximately room temperature, before adding the furfuryl alcohol.

2. The mixture of the reactants is kept in a water bath at about 20 to 30° C. until it shows no tendency to generate heat spontaneously. This usually takes several hours, generally about 3 to 10 hours.

3. Or the mixture of the reactants is allowed to warm to about 40–60° C. and then is cooled in cold water.

The first method is preferred particularly where formaldehyde is a constituent of the mixture for the solutions remain reasonably stable at relatively low viscosities for periods of about two months and longer.

The stability of the viscosities of the solutions is indicative that the reactants have not reacted to any substantial extent and that the solutions consist essentially of a mixture of the reactants. Some slight rise in viscosity of the solutions does, however, occur in time, as will be evident from the illustrative example herein, and hence the impregnating solutions of the present invention may contain varying but relatively small amounts of a reaction product of the reactants.

The proportions of the reactants in the stable, low viscosity liquid impregnating solutions of the present invention may be varied widely, as desired, from one mol of ammonium thiocyanate to about one to sixty mols each of furfuryl alcohol and the aldehyde. For most uses, the proportions of reactants giving good results vary from equimolar to from one mol of ammonium thiocyanate to about eight to ten mols each of the other reactants. In the case of solutions made from furfural, furfuryl alcohol and ammonium thiocyanate, the solutions are not homogeneous when less than about two molar proportions each of the furfural and the furfuryl alcohol per mol of the thiocyanate are used. In such cases, the solutions can be made homogeneous by the addition of some water, say about 1 to 10% of water.

The following are examples of suitable stable, low viscosity, potentially reactive, impregnating solutions in accordance with the present invention, all proportions being in mols.

| Solution | NH₄SCN | Furfuryl Alcohol | Formalin 37% | Furfural | Water |
|---|---|---|---|---|---|
| A | 1 | 1 |  | 1 | 2 |
| B | 1 | 4 |  | 4 |  |
| C | 1 | 4 |  | 1 |  |
| D | 1 | 4 |  | 2 |  |
| E | 1 | 4 |  | 6 |  |
| F | 1 | 6 |  | 3 |  |
| G | 1 | 6 |  | 6 |  |
| H | 1 | 8 |  | 2 |  |
| I | 1 | 8 |  | 4 |  |
| J | 1 | 8 |  | 8 |  |
| K | 1 | 8 | 8 |  | 18 |
| L | 1 | 8 | 8 |  |  |
| M | 1 | 4 | 4 |  |  |
| N | 1 | 4 | 1 | 3 |  |
| O | 1 | 4 | 2 | 2 |  |
| P | 1 | 4 | 3 | 1 |  |

Solutions A to J were made by simultaneously mixing the reactants; solutions K and M by procedure number 1, supra; solutions N, O and P by procedure number 2, supra; and solution L by procedure number 3.

The following specific examples illustrate the invention. In these examples parts indicated are parts by weight.

*Example 1.—Solution K*

A mixture consisting of 76 parts (1.0 mole) ammonium thiocyanate, 650 parts (8.0 moles) of a 37 per cent formalin solution and 324 parts (18 moles) water was allowed to stand for a period of about 18 hours at room temperature. 784 parts (8.0 moles) furfuryl alcohol were then added to the mixture.

*Example 2.—Solution L*

A mixture consisting of 76 parts (1.0 mole) ammonium thiocyanate, 784 parts (8.0 moles) furfuryl alcohol and 650 parts (8.0 moles) of a 37 per cent formalin solution was allowed to stand at room temperature until the temperature of the mixture had risen to about 50° C., after which it was cooled in cold water.

*Example 3.—Solution M*

A mixture consisting of 76 parts (1.0 mole) ammonium thiocyanate and 325 parts (4.0 moles) of a 37 per cent formalin solution was allowed to stand for a period of approximately 17 hours at room temperature after which time 392 parts (4.0 moles) furfuryl alcohol were added to the mixture.

*Example 4.—Solution B*

76 parts (1.0 mole) ammonium thiocyanate were dissolved in a mixture of 392 parts (4.0 moles) furfuryl alcohol and 384 parts (4.0 moles) furfural.

Tests on the viscosities (approximation of the viscosity was determined by noting of the time a given amount would drain from a pipette as compared to an equal amount of water) of the solutions of Examples 1 to 4 were taken to determine the stability thereof. The tests were kinematic viscosity determinations at 20° C., except for those taken on the 49th day, which were at 24° C. (Kinematic viscosity=absolute viscosity÷density.)

The viscosities, in centipoises, of solutions K and L were, shortly after formation, respectively, 1.08 and 1.18; on the 9th day, 1.42 and 1.95; on the 12th day, 1.45 and 2.00; on the 16th day, 1.42 and 1.96; on the 23rd day, 1.46 and 2.09; and on the 49th day, 1.31 and 1.96.

The viscosity of solution M after formation was 1.48; on the 8th day, 2.09; on the 11th day, 2.19; on the 15th day, 2.21; and on the 22nd day, 2.37.

The viscosity of solution B after formation was 1.06; after about 16 hours, 1.33; on the 8th day, 1.7; on the 11th day, 1.93; on the 15th day, 2.5; on the 21st day, 4.1; and on the 48th day, 25. On the 21st day the solution was still usable as an impregnating solution in accordance with the present invention, but thereafter its viscosity increased rapidly and it became too viscous for use.

The pH's of solutitons K, L, M and B were tested on the 9th day and were, respectively, 3.9, 3.9, 4.0 and 3.0.

*Example 5*

A plaster mix consisting of 320 parts plaster of Paris and 200 parts of water was cast into bars with a cross section of about 1¾" and dried to constant weight at 37° C. After cutting into blocks about 1" long, the blocks were immersed in the impregnating solution of Example 4 for a period of about 8 minutes which was sufficient for substantially complete penetration of the solution into the block, about 92% of the theoretical maximum possible uptake. The amount of resin uptake in per cent based on the original plaster was 40.5. After curing for a period of about 6 hours at 85–100° C. the amount of cured resin contained in the plaster was 18% based on the original weight of the plaster. Similarly, the impregnating solutions corresponding to Examples 1, 2, and 3 were also tested. The results were as follows: uptake 51%, 47%, and 46%, respectively. The cured resin in the plaster was 12%, 24%, and 23%, respectively.

Resin retention was also determined. By retention we mean the proportion of the impregnant remaining in the plaster after curing. The retention for the four solutions was as follows:

| Solution | Retention |
|---|---|
|  | Per cent |
| K | 23 |
| L | 50 |
| M | 50 |
| B | 44 |

The impregnating solution may, if desired, be incorporated in the plaster mix before casting. Also, if desired, a catalyst may be incorporated into the mix along with the impregnating solution. Suitable catalysts are, for example, aniline hydrochloride, oxalic acid, trichloroacetic acid, maleic acid, tartaric acid, ferric chloride hexahydrate, zinc chloride and ethylene diamine hydrochloride. These catalysts can be used in varying amounts, but best results are obtained when using about 7% by weight of catalyst based on the weight of the furfuryl alcohol. These catalysts, particularly aniline hydrochloride and oxalic acid, when used as described above, serve to increase the resin retention very markedly.

The invention has been described in connection with some detailed examples illustrating the invention. The invention, however, is not to be restricted to these examples or to the details for these may be varied without departing from the scope of the invention claimed in the appended claims. It is to be understood that the solutions of the present invention may be used in admixture with various materials where such materials do not alter to any substantial extent the high penetrating powers of the solutions. Thus, for example, the solutions may be used in admixture with dyes and/or resins, either natural or synthetic, which are soluble therein.

We claim:

1. A method of producing a potentially reactive, low viscosity liquid impregnating solution having high penetrating powers, comprising mixing ammonium thiocyanate and an aldehyde and holding the mixture for about 1 to 24 hours at approximately room temperature, and then adding furfuryl alcohol thereto.

2. A method of producing a potentially reactive, low viscosity liquid impregnating solution having high penetrating powers, comprising mixing ammonium thiocyanate and formaldehyde and holding the mixture for about 1 to 24 hours at approximately room temperature, and then adding furfuryl alcohol thereto.

3. A method of producing a potentially reactive, low viscosity liquid impregnating solution having high penetrating powers, comprising mixing ammonium thiocyanate, an aldehyde and water and holding the mixture for about 1 to 24 hours at approximately room temperature, and then adding furfuryl alcohol thereto.

4. A method of producing a potentially reactive, low viscosity liquid impregnating solution having high penetrating powers, comprising mixing ammonium thiocyanate, formaldehyde and water and holding the mixture for about 1 to 24 hours at approximately room temperature, and then adding furfuryl alcohol thereto.

ANDREW P. DUNLOP.
PAUL R. STOUT.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,306,924 | Zerweck | Dec. 29, 1942 |
| 2,368,426 | Root | Jan. 30, 1945 |
| 2,377,995 | Coes | June 12, 1945 |
| 2,416,038 | Adams | Feb. 18, 1947 |
| 2,468,056 | Goepfert | Apr. 26, 1949 |
| 2,526,643 | Dunlop | Oct. 24, 1950 |